United States Patent
Phillips et al.

(10) Patent No.: US 7,758,464 B2
(45) Date of Patent: Jul. 20, 2010

(54) MULTI-SPEED TRANSMISSION

(75) Inventors: Andrew W. Phillips, Saline, MI (US);
James M. Hart, Belleville, MI (US);
Scott H. Wittkopp, Ypsilanti, MI (US);
Clinton E. Carey, Monroe, MI (US);
Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 410 days.

(21) Appl. No.: 11/950,460

(22) Filed: Dec. 5, 2007

(65) Prior Publication Data

US 2008/0280722 A1 Nov. 13, 2008

Related U.S. Application Data

(60) Provisional application No. 60/916,456, filed on May 7, 2007.

(51) Int. Cl.
*F16H 3/44* (2006.01)
(52) U.S. Cl. .................. 475/269; 475/275; 475/330
(58) Field of Classification Search .......... 475/269, 475/275, 330
See application file for complete search history.

(56) References Cited

U.S. PATENT DOCUMENTS

| | | | |
|---|---|---|---|
| 6,176,803 B1 | 1/2001 | Meyer | |
| 6,342,026 B1 | 1/2002 | Takagi | |
| 6,547,688 B2 | 4/2003 | Takagi | |
| 6,736,751 B1 | 5/2004 | Usoro | |
| 6,743,139 B1 | 6/2004 | Usoro | |
| 6,743,140 B1 | 6/2004 | Lee | |
| 6,743,142 B1 | 6/2004 | Lee | |
| 6,743,143 B1 | 6/2004 | Usoro | |
| 6,743,144 B1 | 6/2004 | Lee | |
| 6,746,357 B1 | 6/2004 | Usoro | |
| 6,752,736 B1 | 6/2004 | Lee | |
| 6,755,765 B2 | 6/2004 | Usoro | |
| 6,758,784 B2 | 7/2004 | Lee | |
| 6,758,787 B2 | 7/2004 | Usoro | |
| 6,764,424 B1 | 7/2004 | Usoro | |
| 6,764,425 B2 | 7/2004 | Lee | |
| 6,764,426 B2 | 7/2004 | Lee | |
| 6,767,307 B1 | 7/2004 | Lee | |
| 6,811,512 B2 | 11/2004 | Usoro | |
| 6,837,823 B2 | 1/2005 | Lee | |
| 6,852,059 B2 | 2/2005 | Lee | |
| 6,960,149 B2 | 11/2005 | Ziemer | |
| 7,011,597 B2 | 3/2006 | Haka | |
| 7,014,589 B2 | 3/2006 | Stevenson | |
| 7,128,683 B2 | 10/2006 | Oguri | |
| 7,163,484 B2 | 1/2007 | Klemen | |
| 2006/0019791 A1 | 1/2006 | Baldwin | |
| 2006/0270514 A1 | 11/2006 | Oguri | |
| 2006/0270516 A1 | 11/2006 | Klemen | |
| 2008/0242472 A1* | 10/2008 | Phillips et al. | 475/275 |
| 2008/0242481 A1* | 10/2008 | Phillips et al. | 475/276 |
| 2008/0242482 A1* | 10/2008 | Phillips et al. | 475/276 |

* cited by examiner

*Primary Examiner*—David D Le

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches.

13 Claims, 2 Drawing Sheets

| GEAR STATE | GEAR RATIO | RATIO STEP | CLUTCHING ELEMENTS | | | | |
|---|---|---|---|---|---|---|---|
| | | | 28 | 34 | 32 | 24 | 26 |
| REV | -3.154 | | X | X | | | X |
| N | | -0.73 | O | | | | O |
| 1ST | 4.300 | | X | | | X | X |
| 2ND | 3.022 | 1.42 | X | | X | | X |
| 3RD | 2.139 | 1.41 | X | | X | X | |
| 4TH | 1.735 | 1.23 | X | X | X | | |
| 5TH | 1.380 | 1.26 | X | X | | X | |
| 6TH | 1.152 | 1.20 | | X | X | X | |
| 7TH | 1.000 | 1.15 | | X | | X | X |
| 8TH | 0.809 | 1.24 | | X | X | | X |

X = ON - CARRYING TORQUE
O = ON - NOT CARRYING TORQUE

FIG. 3

MULTI-SPEED TRANSMISSION

CROSS-REFERENCE TO RELATED APPLICATIONS

This application claims the benefit of U.S. Provisional Application No. 60/916,456, filed on May 7, 2007. The disclosure of the above application is incorporated herein by reference.

FIELD

This application relates to a multiple speed transmission having a plurality of planetary gear sets and a plurality of torque transmitting devices and more particularly to a transmission having eight or more speeds, four planetary gear sets and a plurality of torque transmitting devices

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches.

One embodiment of the transmission of the present invention includes an input member, an output member, first, second, third and fourth planetary gear sets each having first, second and third members. A first interconnecting member continuously interconnects the third member of the first planetary gear set with a stationary element. A second interconnecting member continuously interconnects the first member of the second planetary gear set with the stationary element. A third interconnecting member continuously interconnects the first member of the fourth planetary gear set with the second member of the second planetary gear set. A fourth interconnecting member continuously interconnects the third member of the third planetary gear set with the second member of the second planetary gear set. Five torque-transmitting mechanisms are selectively engageable to interconnect one of the first, second, and third members with another of the first, second, and third members. The torque-transmitting mechanisms are selectively engageable in combinations of at least three to establish at least eight forward speed ratios and at least one reverse speed ratio between the input member and the output member.

In another aspect of the embodiment of the present invention, a first of the five torque transmitting mechanisms is selectively engageable to interconnect the second member of the first planetary gear set with the second member of the fourth planetary gear set.

In yet another aspect of the embodiment of the present invention, a second of the five torque transmitting mechanisms is selectively engageable to interconnect the second member of the fourth planetary gear set with the third member of the second planetary gear set.

In yet another aspect of the embodiment of the present invention, a third of the five torque transmitting mechanisms is selectively engageable to interconnect the third member of the fourth planetary gear set with the second member of the third planetary gear set.

In yet another aspect of the embodiment of the present invention, a fourth of the five torque transmitting mechanisms is selectively engageable to interconnect the third member of the fourth planetary gear set with the first member of the third planetary gear set.

In yet another aspect of the embodiment of the present invention, a fifth of the five torque transmitting mechanisms is selectively engageable to interconnect the first member of the first planetary gear set with the first member of the third planetary gear set.

In yet another aspect of the embodiment of the present invention, the torque transmitting mechanisms are clutches.

In yet another aspect of the embodiment of the present invention, the first members are sun gears, the second members are carrier members, and the third members are ring gears.

In yet another aspect of the embodiment of the present invention, the input member is continuously interconnected with the second member of the third planetary gear set and the output member is continuously interconnected with the second member of the first planetary gear set.

Another embodiment of the transmission of the present invention includes an input member, an output member, first, second, third and fourth planetary gear sets each having first, second and third members, wherein the input member is continuously interconnected with the second member of the third planetary gear set and the output member is continuously interconnected with the second member of the first planetary gear set. A first interconnecting member continuously interconnects the third member of the first planetary gear set with a stationary element. A second interconnecting member continuously interconnects the first member of the second planetary gear set with the stationary element. A third interconnecting member continuously interconnects the first member of the fourth planetary gear set with the second member of the second planetary gear set. A fourth interconnecting member continuously interconnects the third member of the third planetary gear set with the second member of the second planetary gear set. A first torque transmitting mechanism is selectively engageable to interconnect the second member of the first planetary gear set with the second member of the fourth planetary gear set. A second torque transmitting mechanism is selectively engageable to interconnect the second member of the fourth planetary gear set with the third member of the second planetary gear set. A third torque transmitting mechanism is selectively engageable to interconnect the third member of the fourth planetary gear set with the second member of the third planetary gear set. A fourth torque transmitting mechanism is selectively engageable to interconnect the third member of the fourth planetary gear set with the first member of the third planetary gear set. A fifth torque transmitting mechanism is selectively engageable to interconnect the first member of the first planetary gear set with the first member of the third planetary gear set. The torque-transmitting mechanisms are selectively engageable in combinations of at least three to establish at least eight forward speed ratios and at least one reverse speed ratio between the input member and the output member.

In one aspect of the embodiment of the present invention, the torque transmitting mechanisms are clutches.

In another aspect of the embodiment of the present invention, the first members are sun gears, the second members are carrier members, and the third members are ring gears.

Another embodiment of the transmission of the present invention includes an input member, an output member, first, second, third and fourth planetary gear sets each having a sun gear member, a carrier member, and a ring gear member, wherein the input member is continuously interconnected with the carrier member of the third planetary gear set and the output member is continuously interconnected with the carrier member of the first planetary gear set. A first interconnecting member continuously interconnects the ring gear member of the first planetary gear set with a stationary element. A second interconnecting member continuously interconnects the sun gear member of the second planetary gear set with the stationary element. A third interconnecting member continuously interconnects the sun gear member of the fourth planetary gear set with the carrier member of the second planetary gear set. A fourth interconnecting member continuously interconnects the ring gear member of the third planetary gear set with the carrier member of the second planetary gear set. A first torque transmitting mechanism is selectively engageable to interconnect the carrier member of the first planetary gear set with the carrier member of the fourth planetary gear set. A second torque transmitting mechanism is selectively engageable to interconnect the carrier member of the fourth planetary gear set with the ring gear member of the second planetary gear set. A third torque transmitting mechanism is selectively engageable to interconnect the ring gear member of the fourth planetary gear set with the carrier member of the third planetary gear set. A fourth torque transmitting mechanism is selectively engageable to interconnect the ring gear member of the fourth planetary gear set with the sun gear member of the third planetary gear set. A fifth torque transmitting mechanism is selectively engageable to interconnect the sun gear member of the first planetary gear set with the sun gear member of the third planetary gear set. The torque-transmitting mechanisms are selectively engageable in combinations of at least three to establish at least eight forward speed ratios and at least one reverse speed ratio between the input member and the output member.

Further objects, aspects and advantages of the present application will become apparent by reference to the following description and appended drawings wherein like reference numbers refer to the same component, element or feature.

DRAWINGS

The drawings described herein are for illustrative purposes only and are not intended to limit the scope of the present disclosure in any way. The various features, advantages and other uses of the present disclosure will become more apparent by reference to the following detailed description and drawings in which:

FIG. 3 is a truth table presenting the state of engagement of the various torque transmitting clutches in each of the available forward and reverse speeds or gear ratios of the eight speed transmission illustrated in FIG. 1 and FIG. 2.

DETAILED DESCRIPTION

The following description is intended to be exemplary in nature and is not intended to limit the present disclosure, application, or uses of the present disclosure in any way.

It should be appreciated that embodiments of the eight speed automatic transmission of the present invention have an arrangement of permanent mechanical connections between the elements of the four planetary gear sets in common. A first component or element of a first planetary gear set is permanently coupled to a ground. A first component or element of a second planetary gear set is also permanently coupled to the ground. A second component or element of the second planetary gear set is permanently coupled to a second component or element of a third planetary gear set. Furthermore, the second component or element of the second planetary gear set is also permanently coupled to a second component or element of a fourth planetary gear set.

Figure 1:
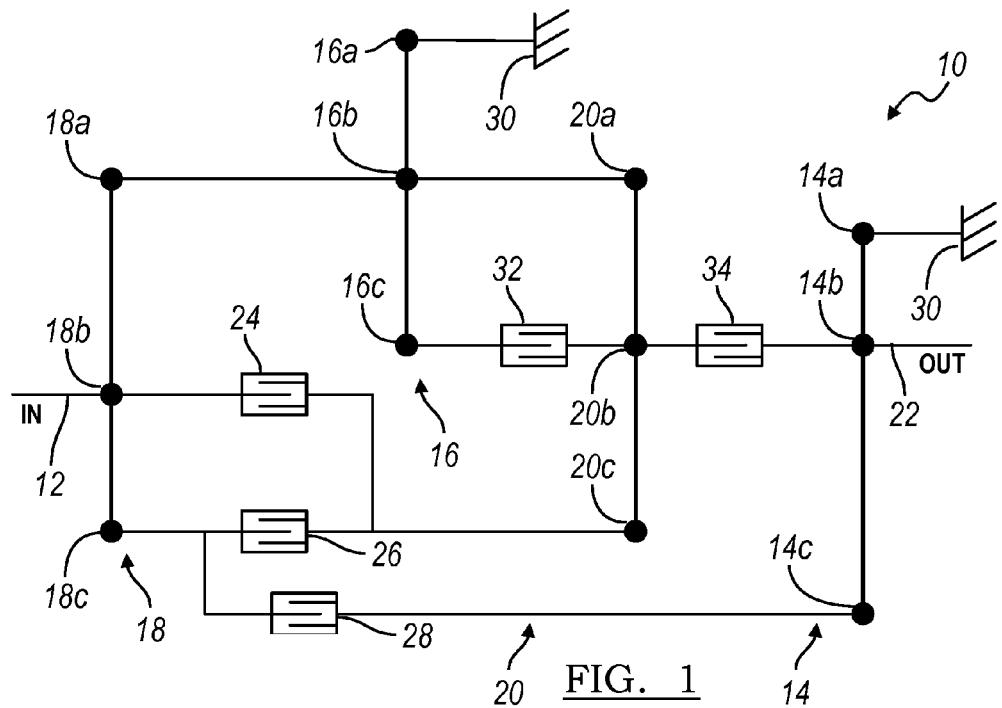
FIG. 1 is a lever diagram of an eight speed transmission in accordance with an exemplary embodiment of the present disclosure.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input 12 is coupled to the second node 18B of the third planetary gear set 18. The output is coupled to the second node 14B of the first planetary gear set 14. The first node 14A of the first planetary gear set 14 is coupled to a ground or transmission housing 30. The first node 16A of the second planetary gear set 16 is also coupled to the ground or the transmission housing 30. The second node 16B of the second planetary gear set 16 is coupled to the first node 18A of the third planetary gear set 18. The second node 16B of the second planetary gear set 16 is further coupled to the first node 20A of the fourth planetary gear set 20.

A first clutch 24 selectively connects the second node 18B of the third planetary gear set 18 to the third node 20C of the fourth planetary gear set 20. A second clutch 26 selectively connects the third node 18C of the third planetary gear set 18 to the third node 20C of the fourth planetary gear set 20. A third clutch 28 selectively connects the third node 18C of the third planetary gear set 18 to the third node 14C of the first planetary gear set 14. A fourth clutch 32 selectively connects the third node 16C of the second planetary gear set 16 to the second node 20B of the fourth planetary gear set 20. A fifth clutch 34 selectively connects the second node 20B of the fourth planetary gear set 20 to the second node 14B of the first planetary gear set 14.

Figure 2:
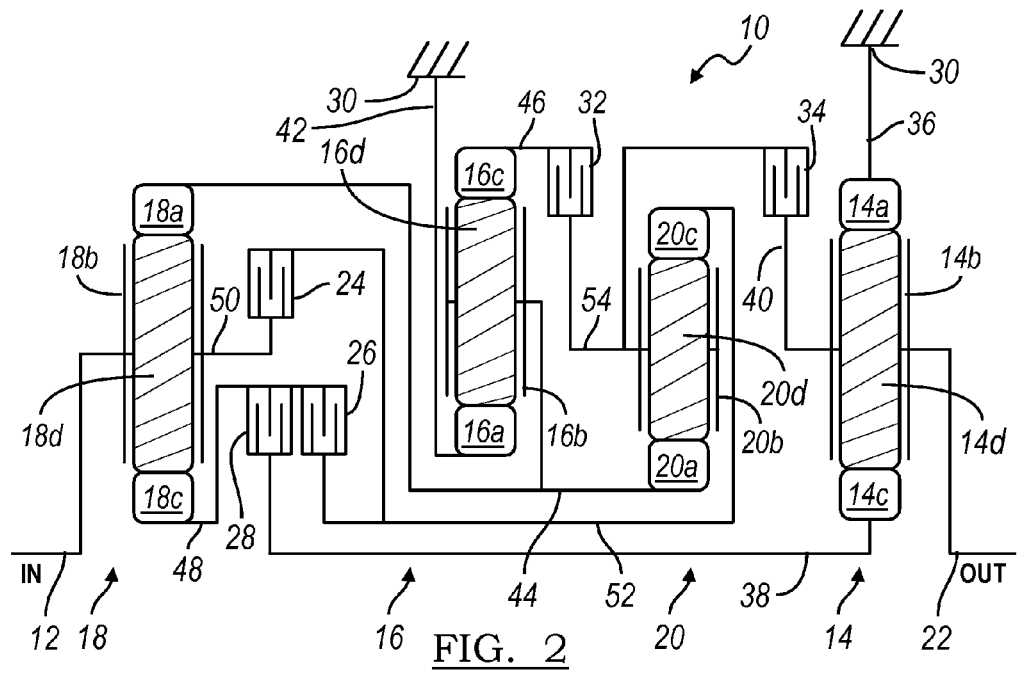
FIG. 2 is a diagrammatic view of the eight speed transmission in FIG. 1 in accordance with an exemplary embodiment of the present disclosure.

Referring to FIG. 2, a stick diagram illustrates a schematic layout of the embodiment of the eight speed transmission 10 in accordance with the present disclosure. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, planetary gear set 14 is a planetary gear set that includes a sun gear member 14C, a planet gear carrier member 14B and a ring gear member 14A. Ring gear member 14A is connected for common rotation with a first shaft or interconnecting member 36 which is fixed to the ground or transmission housing 30. Sun gear member 14C is connected for a common rotation with a second shaft or interconnecting member 38. The planet gear carrier 14B rotatably supports a set of planet gears 14D and is connected for common rotation with a third shaft or interconnecting member 40 and the output 22. The planet gears 14D are configured to intermesh with the sun gear member 14C and the ring gear member 14A.

The input shaft or member 12 is continuously connected to an engine or to a turbine of a torque converter (not shown). The output shaft or member 22 is continuously connected with the final drive unit or transfer case (not shown).

Planetary gear set 16 is a planetary gear set that includes a sun gear member 16A, a planet carrier member 16B that rotatably supports a set of planet gears 16D and a ring gear member 16C. Sun gear member 16A is connected to a fourth shaft or interconnecting member 42 which is connected to ground to prevent rotation of sun gear number 16A. Planet carrier member 16B is connected for common rotation with a fifth shaft or interconnecting member 44. Ring gear member 16C is connected for common rotation with a sixth shaft or interconnecting 46. Planet gears 16D are configured to intermesh with both the sun gear member 16A and the ring gear member 16C.

Planetary gear set 18 is a planetary gear set that includes a sun gear member 18C, a planet carrier member 18B and a ring gear member 18A. Sun gear member 18C is connected for common rotation with a seventh shaft or interconnecting member 48. Planet carrier member 18B is connected to the input 12 and to an eighth shaft or interconnecting member 50. Ring gear member 18A is connected for common rotation with the fifth shaft or interconnecting member 44. Planet gears 18D are configured to intermesh with both the sun gear member 18C and the ring gear member 18A.

Planetary gear set 20 is a planetary gear set that includes a sun gear member 20A, a planet carrier member 20B and a ring gear member 20C. Sun gear member 20A is connected for common rotation with the fifth shaft or interconnecting member 44. Ring gear member 20C is connected for common rotation with a ninth shaft or interconnecting member 52. Planet carrier member 20B is connected for common rotation with the tenth shaft or interconnecting member 54. Planet gears 20D are configured to intermesh with both the sun gear member 20A and the ring gear member 20C.

The torque-transmitting mechanisms or clutches 24, 26, 28, 32 and 34 allow for selective interconnection of the shafts or interconnecting members, members of the planetary gear sets and the housing. For example, the first clutch 24 is selectively engageable to connect the eighth shaft or interconnecting member 50 to the ninth shaft or interconnecting member 52. The second clutch 26 is selectively engageable to connect the seventh shaft or interconnecting member 48 to the ninth shaft or interconnecting member 52. The third clutch 28 is selectively engageable to connect the seventh shaft or interconnecting member 48 to the second shaft or interconnecting member 38. The fourth clutch 32 is selectively engageable to connect the sixth shaft or interconnecting member 46 to the tenth shaft or interconnecting member 54. The fifth clutch 34 is selectively engageable to connect the tenth shaft or interconnecting member 54 to the third shaft or interconnecting member 40.

Referring now to FIG. 2 and to FIG. 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 32, and fifth clutch 34), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. Examples of the gear ratios that may be obtained using the embodiments of the present disclosure are also shown in FIG. 3. Of course, other gear ratios are achievable depending on the gear diameter, gear teeth count and gear configuration selected.

To establish reverse gear, the second clutch 26, the third clutch 28 and the fifth clutch 34 are engaged or activated. As previously asserted in the disclosure, the second clutch 26 connects the seventh shaft or interconnecting member 48 to the ninth shaft or interconnecting member 52. The third clutch 28 connects the seventh shaft or interconnecting member 48 to the second shaft or interconnecting member 38. The fifth clutch 34 connects the tenth shaft or interconnecting member 54 to the third shaft or interconnecting member 40.

It should be appreciated that the foregoing explanation of operation and gear states of the eight speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
    an input member;
    an output member;

first, second, third and fourth planetary gear sets each having first, second and third members;
a first interconnecting member continuously interconnecting the third member of the first planetary gear set with a stationary element;
a second interconnecting member continuously interconnecting the first member of the second planetary gear set with the stationary element;
a third interconnecting member continuously interconnecting the first member of the fourth planetary gear set with the second member of the second planetary gear set;
a fourth interconnecting member continuously interconnecting the third member of the third planetary gear set with the second member of the second planetary gear set; and
five torque-transmitting mechanisms each of which is selectively engageable to interconnect at least one of the first, second, and third members with at least another one of the first, second, and third members
wherein the torque-transmitting mechanisms are selectively engageable in combinations of at least three to establish at least eight forward speed ratios and at least one reverse speed ratio between the input member and the output member.

2. The transmission of claim 1 wherein the torque transmitting mechanisms are clutches.

3. The transmission of claim 1 wherein the first members are sun gears, the second members are carrier members, and the third members are ring gears.

4. The transmission of claim 1 wherein a first of the five torque transmitting mechanisms is selectively engageable to interconnect the second member of the first planetary gear set with the second member of the fourth planetary gear set.

5. The transmission of claim 4 wherein a second of the five torque transmitting mechanisms is selectively engageable to interconnect the second member of the fourth planetary gear set with the third member of the second planetary gear set.

6. The transmission of claim 5 wherein a third of the five torque transmitting mechanisms is selectively engageable to interconnect the third member of the fourth planetary gear set with the second member of the third planetary gear set.

7. The transmission of claim 6 wherein a fourth of the five torque transmitting mechanisms is selectively engageable to interconnect the third member of the fourth planetary gear set with the first member of the third planetary gear set.

8. The transmission of claim 7 wherein a fifth of the five torque transmitting mechanisms is selectively engageable to interconnect the first member of the first planetary gear set with the first member of the third planetary gear set.

9. The transmission of claim 7 wherein the input member is continuously interconnected with the second member of the third planetary gear set and the output member is continuously interconnected with the second member of the first planetary gear set.

10. A transmission comprising:
an input member;
an output member;
first, second, third and fourth planetary gear sets each having first, second and third members, wherein the input member is continuously interconnected with the second member of the third planetary gear set and the output member is continuously interconnected with the second member of the first planetary gear set;
a first interconnecting member continuously interconnecting the third member of the first planetary gear set with a stationary element;
a second interconnecting member continuously interconnecting the first member of the second planetary gear set with the stationary element;
a third interconnecting member continuously interconnecting the first member of the fourth planetary gear set with the second member of the second planetary gear set;
a fourth interconnecting member continuously interconnecting the third member of the third planetary gear set with the second member of the second planetary gear set;
a first torque transmitting mechanism selectively engageable to interconnect the second member of the first planetary gear set with the second member of the fourth planetary gear set;
a second torque transmitting mechanism selectively engageable to interconnect the second member of the fourth planetary gear set with the third member of the second planetary gear set;
a third torque transmitting mechanism selectively engageable to interconnect the third member of the fourth planetary gear set with the second member of the third planetary gear set;
a fourth torque transmitting mechanism selectively engageable to interconnect the third member of the fourth planetary gear set with the first member of the third planetary gear set; and
a fifth torque transmitting mechanism selectively engageable to interconnect the first member of the first planetary gear set with the first member of the third planetary gear set; and
wherein the torque-transmitting mechanisms are selectively engageable in combinations of at least three to establish at least eight forward speed ratios and at least one reverse speed ratio between the input member and the output member.

11. The transmission of claim 10 wherein the torque transmitting mechanisms are clutches.

12. The transmission of claim 10 wherein the first members are sun gears, the second members are carrier members, and the third members are ring gears.

13. A transmission comprising:
an input member;
an output member;
first, second, third and fourth planetary gear sets each having a sun gear member, a carrier member, and a ring gear member, wherein the input member is continuously interconnected with the carrier member of the third planetary gear set and the output member is continuously interconnected with the carrier member of the first planetary gear set;
a first interconnecting member continuously interconnecting the ring gear member of the first planetary gear set with a stationary element;
a second interconnecting member continuously interconnecting the sun gear member of the second planetary gear set with the stationary element;
a third interconnecting member continuously interconnecting the sun gear member of the fourth planetary gear set with the carrier member of the second planetary gear set;
a fourth interconnecting member continuously interconnecting the ring gear member of the third planetary gear set with the carrier member of the second planetary gear set;

a first torque transmitting mechanism selectively engageable to interconnect the carrier member of the first planetary gear set with the carrier member of the fourth planetary gear set;

a second torque transmitting mechanism selectively engageable to interconnect the carrier member of the fourth planetary gear set with the ring gear member of the second planetary gear set;

a third torque transmitting mechanism selectively engageable to interconnect the ring gear member of the fourth planetary gear set with the carrier member of the third planetary gear set;

a fourth torque transmitting mechanism selectively engageable to interconnect the ring gear member of the fourth planetary gear set with the sun gear member of the third planetary gear set; and a fifth torque transmitting mechanism selectively engageable to interconnect the sun gear member of the first planetary gear set with the sun gear member of the third planetary gear set; and wherein the torque-transmitting mechanisms are selectively engageable in combinations of at least three to establish at least eight forward speed ratios and at least one reverse speed ratio between the input member and the output member.

* * * * *